(12) United States Patent
Kariv

(10) Patent No.: US 8,041,740 B1
(45) Date of Patent: Oct. 18, 2011

(54) DATABASE SYSTEM, METHOD, AND COMPUTER PROGRAM PRODUCT FOR RECORDING ENTITY STATE AND TYPE INFORMATION FOR USE DURING SUBSEQUENT PROCESSING OF DATA

(75) Inventor: Adi Kariv, Givatayyim (IL)

(73) Assignee: Amdocs Software Systems Limited, Dulin (IR)

( * ) Notice: Subject to any disclaimer, the term of this patent is extended or adjusted under 35 U.S.C. 154(b) by 462 days.

(21) Appl. No.: 12/042,109

(22) Filed: Mar. 4, 2008

(51) Int. Cl.
*G06F 7/00* (2006.01)
*G06F 17/30* (2006.01)

(52) U.S. Cl. .................................... 707/791; 707/802
(58) Field of Classification Search ................... None
See application file for complete search history.

(56) References Cited

U.S. PATENT DOCUMENTS

| | | | | |
|---|---|---|---|---|
| 6,041,067 | A * | 3/2000 | Takamori et al. | 370/514 |
| 7,010,538 | B1 * | 3/2006 | Black | 707/636 |
| 7,269,664 | B2 * | 9/2007 | Hutsch et al. | 709/246 |
| 7,676,522 | B2 * | 3/2010 | Klein et al. | 707/803 |
| 2001/0040925 | A1 * | 11/2001 | Abelard et al. | 375/240.26 |
| 2003/0004774 | A1 * | 1/2003 | Greene et al. | 705/8 |
| 2004/0139061 | A1 | 7/2004 | Colossi et al. | |
| 2006/0163338 | A1 * | 7/2006 | Allen et al. | 235/375 |
| 2007/0025706 | A1 * | 2/2007 | Kim et al. | 386/112 |
| 2007/0185939 | A1 * | 8/2007 | Prahland et al. | 707/204 |
| 2007/0226438 | A1 * | 9/2007 | Erofeev | 711/162 |
| 2007/0240124 | A1 * | 10/2007 | Taneda et al. | 717/129 |
| 2008/0002723 | A1 * | 1/2008 | Pusateri | 370/401 |

FOREIGN PATENT DOCUMENTS

WO WO 2006/021944 3/2006

OTHER PUBLICATIONS

U.S. Appl. No. 11/970,438, filed Jan. 7, 2008.
U.S. Appl. No. 11/970,449, filed Jan. 7, 2008.
International Search Report from International Application No. PCT/IL04/00741, dated Apr. 5, 2005.
Written Opinion from International Application No. PCT/IL04/00741, dated Apr. 5, 2005.

* cited by examiner

*Primary Examiner* — Kuen Lu
*Assistant Examiner* — Tuan A Pham
(74) *Attorney, Agent, or Firm* — Zilka-Kotab, PC

(57) ABSTRACT

A database system, method, and computer program product are provided for recording entity state and type information for use during subsequent processing of data. In use, data is received from an entity. Further, type information associated with the entity is recorded, and state information associated with the entity is recorded. In addition, the type information and the state information are capable of being used to process the data while tracing on any parallel processing node. Furthermore, the tracing may include any intermediate state or final state associated with the entity or any state associated with a context.

20 Claims, 11 Drawing Sheets

DATABASE SYSTEM, METHOD, AND COMPUTER PROGRAM PRODUCT FOR RECORDING ENTITY STATE AND TYPE INFORMATION FOR USE DURING SUBSEQUENT PROCESSING OF DATA

RELATED APPLICATIONS

The present application is related to PCT application No. PCT/IL2004/000741 granted Mar. 2, 2006, which is incorporated by reference in its entirety for all purposes.

BACKGROUND AND FIELD OF THE INVENTION

The present invention relates to database systems, and more particularly to efficiently and transparently processing complex data sets in database systems.

SUMMARY

A database system, method, and computer program product are provided for recording entity state and type information for use during subsequent processing of data in use, data is received from an entity. Further, type information associated with the entity is recorded, and state information associated with the entity is recorded. In addition, the type information and the state information are capable of being used to process the data while tracing on any parallel processing node. Furthermore, the tracing may include any intermediate state or final state associated with the entity or any state associated with a context.

DETAILED DESCRIPTION

Figure 1:
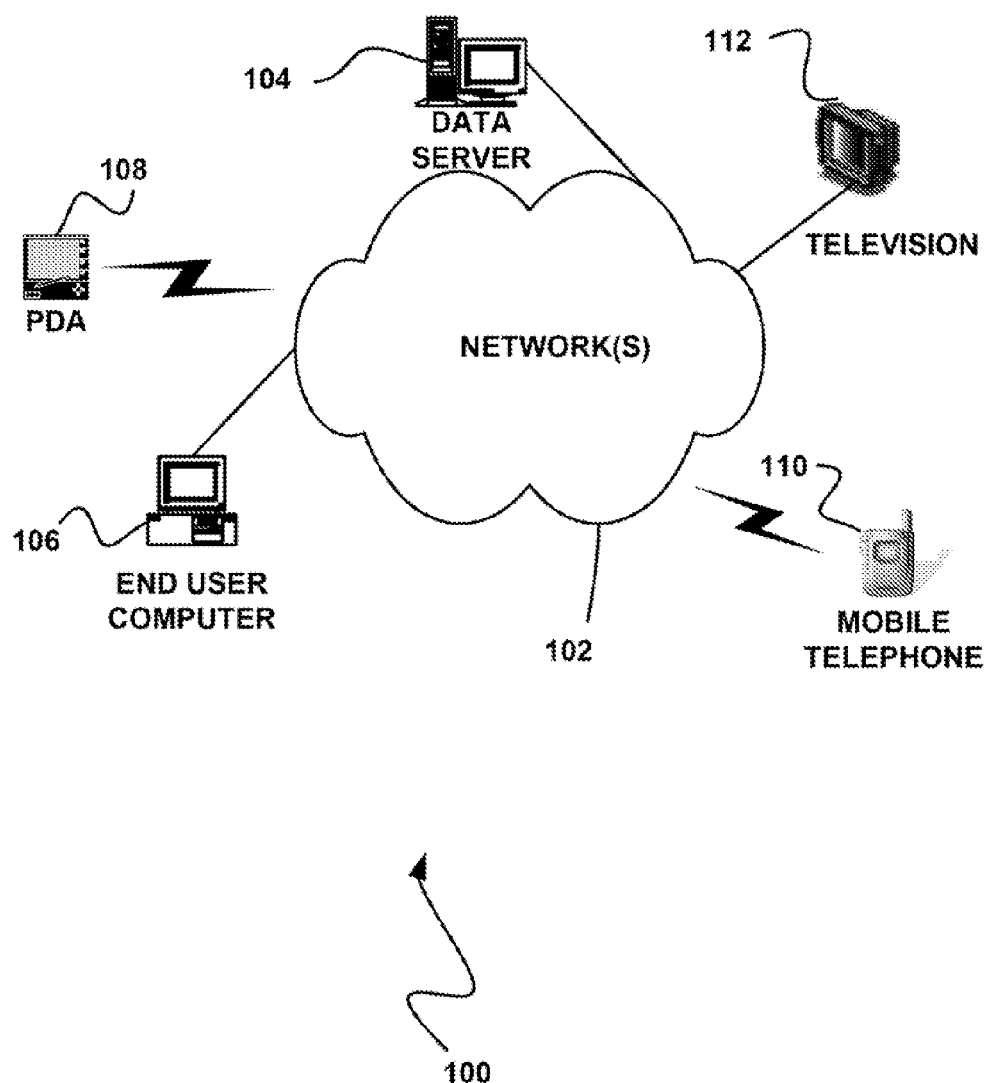
FIG. 1 illustrates a network architecture, in accordance with one embodiment.

FIG. 1 illustrates a network architecture 100, in accordance with one embodiment. As shown, at least one network 102 is provided. In the context of the present network architecture 100, the network 102 may take any form including, but not limited to a telecommunications network; a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
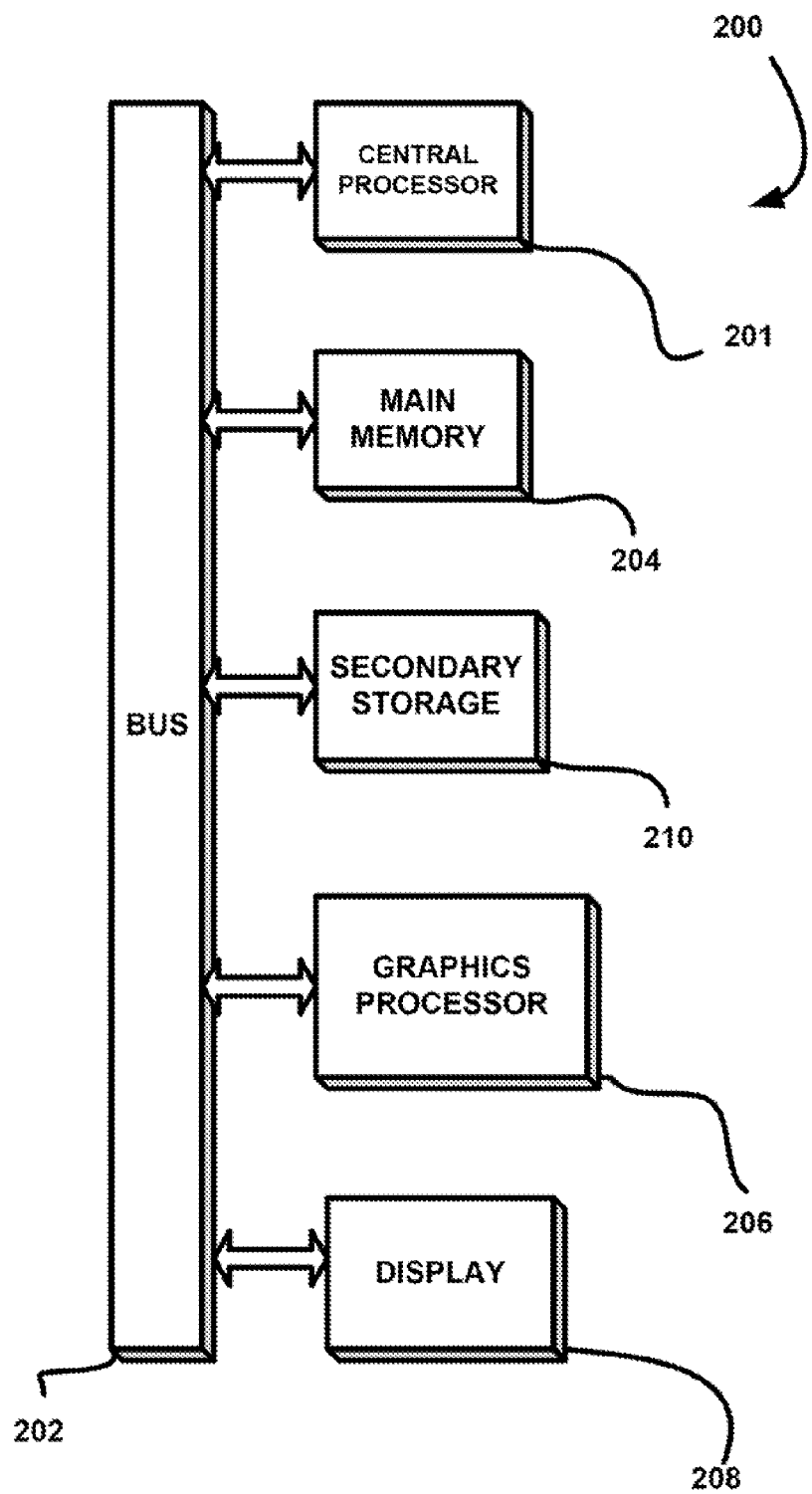
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Figure 3A:
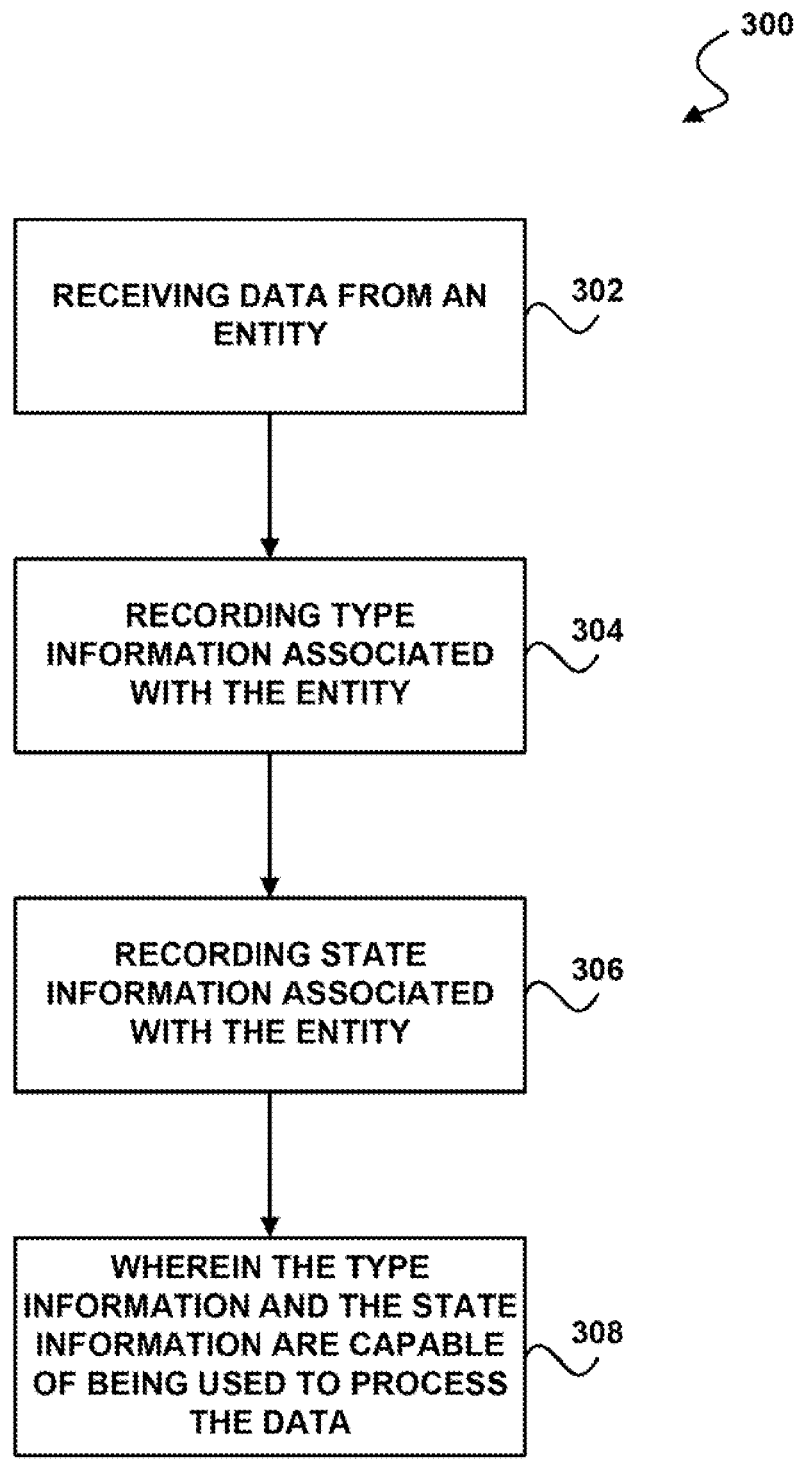
FIG. 3A illustrates a method for recording entity state and type information for use during subsequent processing of data, in accordance with one embodiment.

Computer programs, or computer control logic algorithms, may be stored in the main memory 204 and/or the secondary storage 210. Such computer programs, when executed, enable the computer system 200 to perform various functions. Memory 204, storage 210 and/or any other storage are possible examples of computer-readable media FIG. 3A illustrates a method 300 for recording entity state and type information for use during subsequent processing of data, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

As shown in operation 302, data is received from an entity. Such data may refer to any data capable of being stored in a database. In one embodiment, for example, the data may be a component of a data stream. Further, the entity may include any hardware and/or software entity capable of processing the data. For example, the entity may include an application program. In one possible embodiment, the entity may comprise one or more nodes.

Further, as shown in operation 304, type information associated with the entity is recorded. Additionally, state information associated with the entity is recorded. See operation 306.

In one possible embodiment, the state information may include first state information associated with the entity at a first time, second state information associated with the entity at a second time, and so on. In one embodiment where the entity includes a plurality of nodes, the state information may reflect a state of each of the plurality of nodes. Furthermore, as an option, the state information associated with a plurality of processing nodes may be consolidated.

As an option, the type information and the state information may be encoded in a data structure. In different embodiments, the data structure may or may not include a component of the data, an attribute of the data, etc. In use, the data structure may be capable of being used to process the data, as will soon become apparent.

With continuing reference to FIG. 3, the type information and the state information are capable of being used to process the data. See operation 308. In various embodiments, the state information and/or the type information may be conditionally recoded based on at least one aspect of time.

in use, the type information and the state information may be used to pause an application of a first process being applied to the data and apply a second process to the data. Still, yet, the type information and the state information may be used to resume the application of the first process (e.g. after the second process is complete, etc).

Figure 3B:
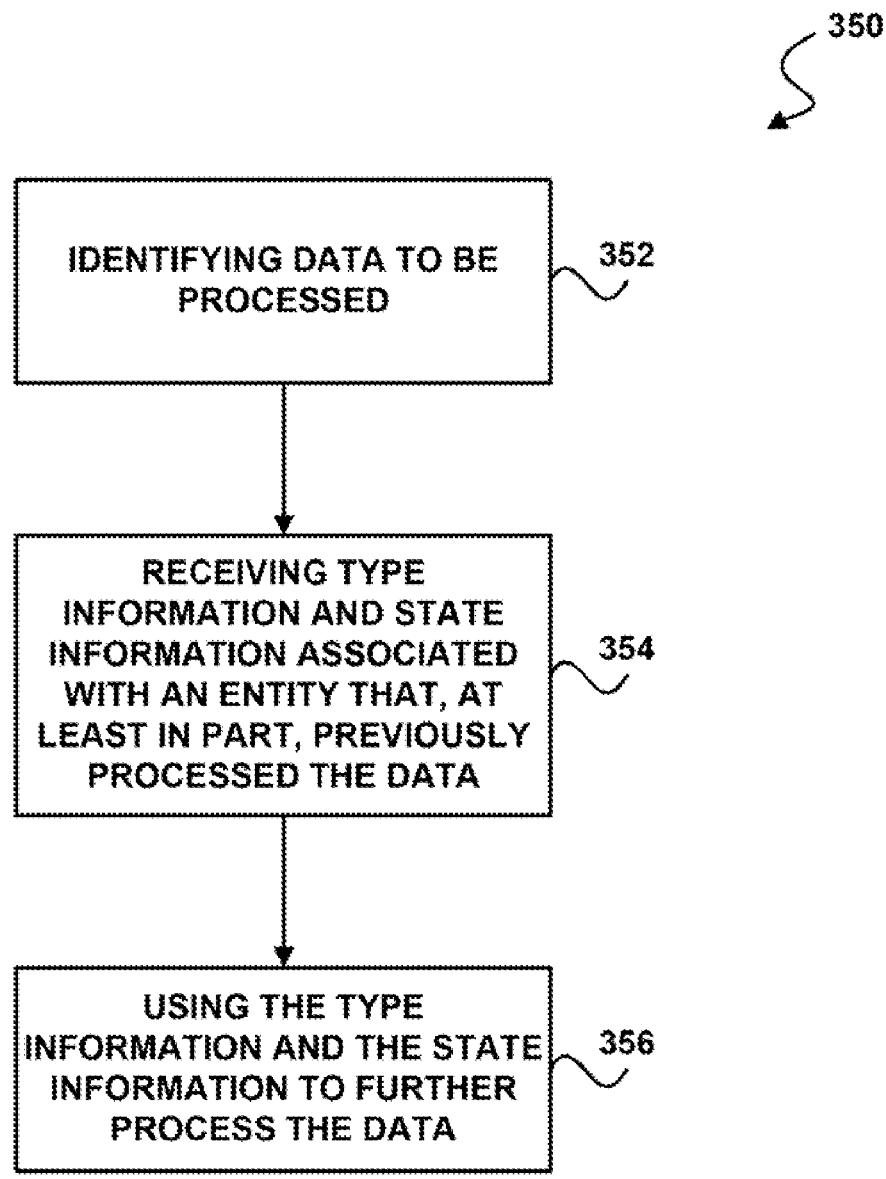
FIG. 3B illustrates a method for tracing entity state and type information during subsequent processing of data, in accordance with another embodiment.

FIG. 3B illustrates a method 350 for tracing entity state and type information during subsequent processing of data, in accordance with another embodiment. As shown in operation 352, data to be processed is identified. Further, as shown in operation 354, type information and state information is received associated with an entity that, at least in part, previously processed the data. Additionally, the type information and the state information are used to further process the data. See operation 356.

More illustrative information will now be set forth regarding various optional architectures and uses in which the foregoing recoding and tracing methods 300, 350 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
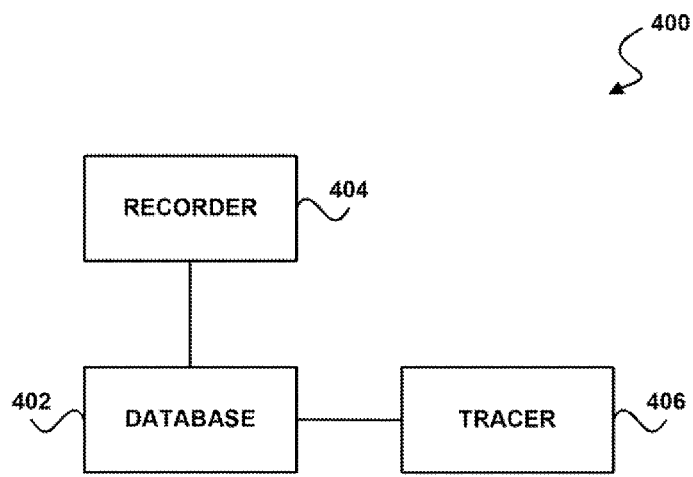
FIG. 4 illustrates a processing system, in accordance with yet another embodiment.

FIG. 4 illustrates a processing system 400, in accordance with yet another embodiment. As an option, the system 400 may be implemented in the context of the details of FIGS. 1-3B. Of course, however, the system 400 may be carried out in any desired environment. Further, the aforementioned definitions may equally apply to the description below.

As shown, the processing system 400 may include as database 402, a recorder 404, and a tracer 406. In use, the database 402 may receive data streams from a plurality of hosts or applications. For example, the data streams may include any data, records, events, and/or alerts received from the plurality of hosts. Further, the data streams may be received via an application programming interface (API), a network connection, a network socket, or any other method of communicating, the data stream from the plurality of hosts to the database. In addition, the plurality of hosts may include clients and servers. Further, these hosts may run specialized software that may collect records, detect fraud, detect intrusions, monitor security, log activity, or any other software capable of generating a data stream.

In addition, the processing system ay include a number of different operations. In one embodiment, the processing system may provide data stream filtering. For example, the data stream filtering may include filtering new data streams in order to match at least one rule. In yet another embodiment, the processing system may provide data stream regrouping. In yet another example, the data stream regrouping may regroup data from the data stream matching at least one rule into another context (e.g. time). Still yet, in another embodiment, the processing system may fire an event if there is a critical mass of waiting data. For example, the event may be fired if the mass of waiting data from the data stream exceeds a threshold.

In one embodiment, the data stream filtering is based on contexts within the data stream. Further, the contexts within the data stream may include the number of distinct appearances of a type of data in the data stream. As an example, the contexts may include a flag such as condition or state, and/or attributes such as time, phone number, duration, session record, source host, etc. In addition, the contexts may be further divided into heavy contexts and light contexts. In one embodiment, light contexts may refer to those conditions and/or attributes that have a few distinct appearances in the data stream. Further, in yet another embodiment, heavy contexts may refer to those conditions and/or attributes that have numerous distinct appearances in the data stream. For example, continually incrementing timestamp data in the data stream may be a heavy context since there may be numerous distinct timestamp values in the data stream.

In still yet another embodiment, the processing system may provide filters that may act upon the contexts in the data stream. In one embodiment, the filters may include an original context filter. As an option, the original context filter may provide the original context as received in the data stream. In another embodiment, the filters may include a reduction of context filter. Optionally, the reduction of context filter may attempt to reduce the scope and/or context of the data stream a broader context. For example, the time context in the data stream may be broadened to a context such as hours, days, months, year, date, etc. Furthermore, in the context of the current example, a heavy context such as time may be reduced to a light context such as date. Further, in yet another embodiment, the filters may include a functional transformation filter. As an option, the functional transformation filter may transform the data stream by a function of the processing system. In still yet another embodiment, the filters may include a state filter. Optionally, the state filter may filter the data stream to a matching state. For example, a data stream including phone numbers may be filtered into states such as a domestic caller, or an international caller. Additionally, in one embodiment, the processing system may be dependent upon the distribution and frequency of the contexts in the data stream for processing.

In yet another embodiment, the processing system may utilize a database 402 (e.g. Adjust). Further, the database 402 may utilize any relational database management system (RDBMS) to implement a finite state oriented system. For example, the database 402 may utilize a RDBMS such as MySQL™ by merely mapping the database 402 operations into Standard Query Language (SQL) operations utilized by the RDBMS. Furthermore, by use of the SQL operations, the database 402 may be transparent to the underlying RDBMS. Furthermore, the database 402 may utilize an API for interacting with the aspects and functionality of the database 402.

In another embodiment, the database 402 may reduce the complexity of a data stream thereby simplifying the data definition and manipulation associated with the data received from the data stream. Further, as an option, the database 402 may utilize a cabinet that may be associated with a metadata definition. For example, the cabinet may be utilized in a physical segment of a physical table in the RDBMS and may be further associated with a particular state. In use, a change in state may be indicated by a change in the cabinet. For example, an employee record may reside in an 'active' cabinet while employed, a 'fired' cabinet if let go, or a 'retired' cabinet if retired. In the context of the present example, the three different cabinets may represent the different states that an employee may exist in during the lifecycle of the record.

Still yet, in another embodiment, each cabinet may utilize a different set of parameters or fields that are used in that particular state.

Additionally, in one embodiment, the cabinet may include a spectrum cabinet. As an option, the spectrum cabinet may include a list of cabinets. Further, as another option, the spectrum cabinet may include a metadata definition that may not be associated with a cabinet. Further, in another embodiment, the cabinet may include a context cabinet. As yet another option, the context cabinet may include a list of cabinets. In still yet another embodiment, the cabinet may include a root cabinet. For example, another cabinet may inherit from the root cabinet.

Furthermore, in yet another embodiment, the data may not be directly inserted into the cabinet, but may instead be inserted via a discharge operation from a specialized table such as a reactor. Additionally, the cabinet may include a set of reserved fields from a previous cabinet. As an example, the set of fields may be utilized as an enumerated state field that may be represented by a field for the cabinet.

Still yet, in another embodiment, each record in the cabinet may include a header field and a body field. Further, as an option, the body field may include multiple data fields such as slots. In addition, as yet another option, the metadata definition may be utilized for mapping the slots of the body field to the actual conditions and/or attributes utilized by other cabinets. Furthermore, in still yet another option, the header field may include additional control fields. In one embodiment, the additional control fields may be utilized for registration, state management, concurrency, identification, abstraction, and connectivity for the cabinet. In yet another embodiment, the header field may be utilized to control and operate upon the records in the cabinet. Additionally, the number of non-empty contexts for the records in a cabinet may be referred to as a cabinet mass. As an example, the cabinet mass may be increased when at least one empty context is populated for the cabinet. Further, in the context of the present example, the cabinet mass may be decreased when at least one empty context is discharged from the cabinet.

In another embodiment, the header may contain a plurality of fields such as a cabinet, registration identification (RegID), linker, link to (LinkTo), registration time (RegTime), and/or tracker. Optionally, the cabinet field may identify the cabinet. For example, the cabinet field may consist of alpha, numeric, alphanumeric, or binary values that may identify the cabinet. Further, as an option, the RegID field may be utilized for linking records from the same cabinet or a plurality of other cabinets to the cabinet. For example, the linked records may be grouped based on a common condition and/or attribute. In addition, as yet another option, the linker field (e.g. Linkey) may be utilized as a unique key for the cabinet. In one embodiment, the linker field may be concatenated from any of the fields in the header. In yet another embodiment, the linker field may be a match key from any field in the cabinet. Additionally, the LinkTo field may include a pointer from the record to a RegID in the same cabinet or the plurality of other cabinets. Furthermore, as an option, the RegTime field may be utilized as a field for storing the time the record was registered in the cabinet. Optionally, the tracker field (e.g. Trackey) may be utilized to store a numeric header utilized in data stream processing. Further, as yet another option, the numeric header may be hashed.

In yet another embodiment, the database 402 may utilize several types of tables that may be used to stored the data. As an option, the several types of tables may be associated with a metadata definition. In one embodiment, the database 402 may utilize a reactor table as a processing table. Optionally, the reactor table may hold the data that is being processed. As an option, the reactor table may be a temporary table. Further, as yet another option, the data in a reactor table may be dropped or inserted, into another table. In addition, in another embodiment, the data from the data stream may enter the processing system 400 through a reactor table of the database 402 such that data from the data stream may insert or update data into the reactor table for processing. In one embodiment, the reactor table may discharge the data into a data table. As another option, once all the data is discharged from the reactor table, the reactor table may be utilized to process a new data stream.

Still yet, in another embodiment, there may be several types of reactor tables (e.g. a driving reactor) that may reference a data stream and may further join with other tables via the linker field. In addition, as an option, a satellite reactor may extend the driving reactor such that each record may be a member in a cabinet with identical RegID numbers. Further, as yet another option, a resulting reactor may serve as a connecting table for the data in the driving reactor and any rules fired from a rules table (e.g. DOQMA table). Additionally, in another embodiment, the resulting reactor may be joined with the same context in a reactor table. Optionally, if the linker field is not unique for the cabinet, then one or more rules may be fired if the result is positive.

In one embodiment, the database 402 may utilize a data table for storing data discharged from the reactor table. Further, the data table may include the linker field that may identify the cabinet for the data. In addition, in yet another embodiment, the database 402 may utilize an archive table for storing historical data. Further, as an option, the archive table may be utilized to store the data associated with a unit of time. For example, the database 402 may have an archive table for each month of the year, such as 'archive_1) to 'archive_12,' in order to store historical data based on the month. As another option, the archive data may be stored in one table with the use of database partitioning. As another example, the archive table for each month of the year may be renamed in order to shift the archives back a month, thereby removing the oldest archive table and creating a new archive table. Optionally, there may be any number of archive tables and not simply the 12 iterations as disclosed in the previous examples.

Furthermore, the database 402 may utilize an accumulator table that may include contexts and other aggregated values. In one embodiment, the contexts of the accumulator table may be locked such that only the aggregated values may be updated. As an option, the aggregator table may collect values on the contexts. Optionally, the aggregator table may allow for joins with other tables via the linker field. Still yet, in another option, the database 402 may utilize a linker table that may link a plurality of header fields to fields in other tables.

Moreover, the database 402 may utilize a rules table where the linker field may hold a permutation of contexts associated with at least one rule. For example, each permutation of the contexts may be identified by a different cabinet identifier. In addition, in one embodiment, an additional field in the rules table may identify a rule that may be fired when a similar context is met for data from the data stream. Further, in yet another embodiment, the rules table may include a unique linker field for each cabinet that may set the context of a reactor's fields associated with the data stream (e.g. a driving reactor). Furthermore, as an option, the processing system 400 may be orthogonal to the number rules. For example, if a new rule includes a plurality of contexts associated with at least one existing filter, then adding a new rule to the rules table may not increase the number of contexts filtered.

In one embodiment, the tables may be joined via the linker field in several different ways. For example, the tables may be joined as a reactor table to another reactor table, a reactor table to a data table, an accumulator table to an archive table, an accumulator table to another accumulator table, etc. As an option, the tables may interact with each other by matching the linker field in a join (e.g. collision). In one example, if the reactor's cabinet, is the same as the existing cabinet, then the contexts of the cabinet may be populated or manipulated with the reference table contexts, in another example, if the reactor's cabinet is different from the existing cabinet, which may indicate a state change, then the fields in the reactor that are not active in the prior cabinet may be updated or manipulated utilizing the reference table fields.

in another embodiment, the database 402 may utilize several state operators for operating on the records in the tables. For example, the database 402 may utilize an arm operator that may occur when the linker field in the header receives a new value for the processing, cycle. As an option, for each filtering iteration, the linker field may be prepared or updated via an absolute arm operation or a relative arm operation. Further, in yet another option, the absolute arm operation may set the linker field in the header. Optionally, the relative arm operation may update the value in the linker field in the header. For example, the updating may include adding an additional context to the linker field.

Additionally, in one embodiment, the database 402 may utilize a disarm operator that may set the cabinet field in the header to zero. As an option, the disarm operator may represent a logical delete of the record from the table. For example, cabinet zero may have a mass of zero. In addition, as yet another option, the database 402 may process only those records with a non-zero value in the cabinet field. Furthermore, in another embodiment, the database 402 may utilize a collision operator. As an option, the collision operator may be similar to a join operator. Further, as another option, the collision may occur between two cabinets via a header field such as a linker. Moreover, as yet another option, the database 402 may utilize a state operator that may change the cabinet number to a non-zero value. For example, a change in state may be represented by a change in the cabinet.

In addition, in yet another embodiment, the database 402 may utilize a charge operator that may occur when the cabinet mass is increased. Further, as an example, the database 402 may utilize a discharge operator if content in a reactor table is moved to a non-reactor table within the same cabinet, thereby decreasing the mass of the reactor table. For example, the discharge operation may occur when filtered data in a reactor table is moved, to a more persistent table. Moreover, in another embodiment, the database 402 may utilize a de-escalate operation. As an option, the de-escalate operation may occur when contexts are copied to another reactor that thereby reduces the mass of the original reactor. For example, the de-escalated reactor may have a role in data stream filtering in combination with a light context filtering process. Additionally, in one embodiment, the database 402 may utilize a rolling operator to move data from one row to the following row. For example, the rolling operator may move data from the Nth row to the Nth+1 row. Furthermore, in still yet another embodiment, the database 402 may utilize a skip operator. Optionally, the skip operator may update a field in the header to disable joins or collisions.

In one embodiment, a reactor may be de-escalated by performing an arm operation on a header LinkTo field such that the LinkTo field may contain a hashed concatenation of light contexts of reactor R1. Further, a charge operation may be performed on reactor R2 in order to charge the header RegID field with the value of the reactor R1 LinkTo field and the reactor R2 slots holding the distinct values of the contexts in reactor R2. In addition, the reactor R2 may be refined with new or modified contexts. As an option, the slots of reactor R1 may exist with the reactor R2 RegID field pointing to the reactor R1 LinkTo field. Additionally, a state operation may be performed on the reactor R1 to redefine the slots moved to reactor R2. Furthermore, as another option, the state operation on reactor R1 may free the unused slots in order for the slots to hold new contexts for future operations.

In another embodiment, the processing system may utilize a recorder 404 (e.g. CREAM). Optionally, the recorder 404 may be coupled to the database 402. In addition, as yet another option, the recorder 404 may be utilized to record information associated with the states and/or the contexts of data in the database 402. For example, the recorder 404 may be utilized to record the states and/or the contexts of the cabinets in the database 402. In yet another embodiment, the recorder 404 may include a plurality of nodes. As an option, the nodes may be processing nodes. Optionally, the nodes may include reactor nodes. Furthermore, as yet another option, each node of the processing nodes may process at least one state. Still yet, as another option, the recorder 404 may record the information for a period of time. Further, as an option, the information may be stored. Additionally, as another option, the recorder 404 may allow for the selection of required states and/or contexts by the tracer 406.

In still yet another embodiment, the processing system may utilize a tracer 406 (e.g. CATAR). Optionally, the tracer 406 may be coupled to the database 402 an option, the tracer 406 may be utilized to select required states and contexts for tracing. Furthermore, a cabinet may be specified for use by the tracer 406. Optionally, the cabinet may include a regular cabinet, a spectrum cabinet, a root cabinet, and/or a context cabinet.

Additionally, in one embodiment, a mode of interaction may be specified between a node and a request. As an option, the mode of interaction may be specified utilizing a trace form. For example, the trace form may include a cabinet controlling cabinet and/or a context controlling cabinet. Optionally, enabling trace may include enabling a freezing mode on at least one node. Further, as another option, when a required cabinet and/or context appears, an action may be available. Furthermore, as yet another option, when a node is frozen, the node may be waiting for the action. Optionally, when the node is frozen, other nodes may be active. Additionally, as yet another option, if another node is waiting on input from a frozen node, the node may not be active.

In one embodiment, the action may include moving, step by step to break the freezing; mode on a node. In another embodiment, the action may include enabling an inquiry to the frozen node. As yet another option, a filtering tool (e.g. DOQMA) may be utilized for filtering and/or rules checking. Furthermore, in yet another embodiment, a stop policy may be utilized. As an option, the stop policy may proceed until a fresh occurrence of a cabinet and/or context occurs in a node. Additionally, in still yet another embodiment, the action may include a changed mass cabinet stop action. Optionally, the changed mass cabinet stop action may indicate that the number of records within a target cabinet has increased or decreased. In one embodiment, the action may include a resume action. As an option, the resume action may indicate that the tracing may be stopped. Optionally, the resume action may indicate that the execution of the node may continue uninterrupted. Furthermore, in another embodiment, the action may include a halt action. As an option, the halt action may stop the tracing application.

in another embodiment, for each step that affects the cabinet field of a reactor, the tracing application may be activated. Optionally, the tracing application may collect data about each affected reactor. In addition, as yet another option, each cabinet matching a search list may be stored in a match reactor. Optionally, the match reactor may include two flip-flop reactors. Furthermore, as yet another option, the flip-flop reactor may be capable of storing two states.

Additionally, in yet another embodiment, if a match occurs, the tracing application may verify that a new appearance of a cabinet matching a search list has occurred since the previous match check. Still yet, as another option, the cabinet may disappear if the cabinet appeared in a previous match reactor but not in the current match reactor. As still yet another option, on a positive match, contexts of the matching cabinet may be found and saved. Furthermore, as another option, if a positive match exists, that may indicate that the required cabinet and/or context was located.

In addition, in one embodiment, if a positive match exists, then the executing node may execute the stop policy. As an option, when the node is stopped, the node may proceed after a request, an action, and/or a timeout. Additionally, as another option, the stop policy may stop on each following node step in order to query the node's content. For example, the node reactor content may be queried. Optionally, a trace form stop policy may be modified on each stop. As yet another option, the trace form stop policy may not be modified on a resume and/or a halt. Furthermore, in yet another option, if a resume and/or halt is issued, the current result of each node may be consolidated.

Figure 5:
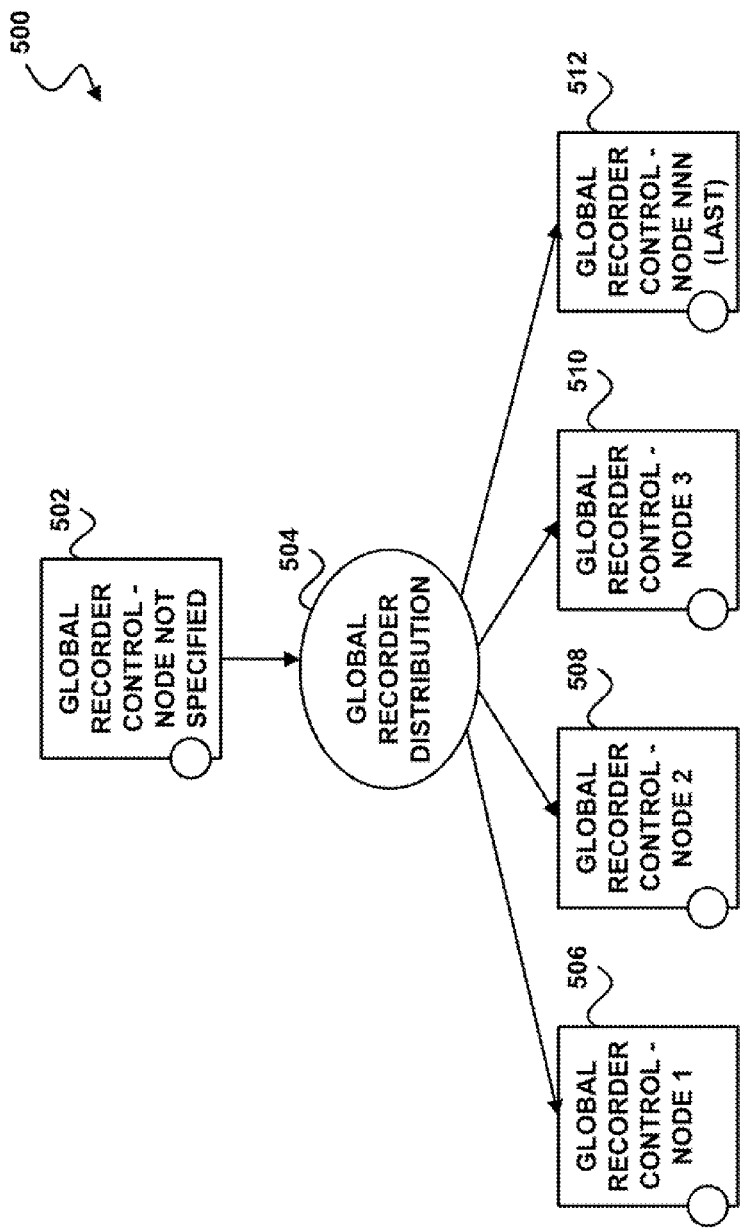
FIG. 5 illustrates a global recorder control distribution system, in accordance with one embodiment.

FIG. 5 illustrates a global recorder control distribution system 500, in accordance with one embodiment. As an option, the system 500 may be implemented in the context of the details of FIGS. 1-4. Of course, however, the system 500 may be carried out in any desired environment. Further, the aforementioned definitions may equally apply to the description below.

In one embodiment, a global recorder controlling, cabinet 502 (e.g. cabinet 2701) may control the global recorder. As an option, metadata may be associated with the global recorder controlling cabinet 502. Further, as yet another option, the metadata may describe the settings and data associated with the global recorder controlling cabinet 502. For example, Table 1 illustrates an exemplary structure of the metadata associated with the global recorder controlling cabinet 502.

TABLE 1

| SLOT | CONTEXT | DESCRIPTION | REMARKS |
|---|---|---|---|
| N1 | SUPERVISOR | | |
| N2 | PROGRAM_NO | | |
| N3 | OSS_NODE | | NULL = ALL |
| N4 | RECORDING_DURATION | | SECONDS |
| N5 | STATES_FOUND | | |
| N6 | STATES_FINAL_FOUND | | |
| N7 | REFRESH_RECORDING | TRUNCATE PREVIOUS RESULTS | 1- REFRESH |
| N8 | REQUEST_NO | | |
| D1 | START_TIME | | ACTUAL START TIME |
| D2 | END_TIME | | ACTUAL END TIME |

In another embodiment, the global recorder application may record for a specified duration. As an option, the specified duration may be specified in the global recorder controlling cabinet 502. Optionally, the specified duration may be specified in a recorder order definition (e.g. RECORDING ORDER) in the global recorder controlling cabinet 502. Further, as an option, the recorder order definition may accumulate current results or truncate old results in an output reactor. As yet another option, multiple recordings may be utilized to cover additional potential states and/or contexts. For example, some states and/or contexts may appear at specific times. Furthermore, in yet another option, the specified duration may be specified in a RECORDING_DURATION context field of the global recorder controlling cabinet 502.

Furthermore, in yet another embodiment, the global recorder application may include multiple global recorder control nodes 506, 508, 510, 512. As an option, each global recorder control node may include at least one processing node. Further, as yet another option, each global recorder control node may handle states specific to each processing node. Optionally, if there are multiple processing nodes, the states and/or contexts may be recorded for a specific processing node. In addition, as another option, the states and/or contexts may be recorded for all processing nodes. In one embodiment, if the states and/or contexts are being recorded for all processing nodes, then a distribution node 504 may be employed. As an option, the distribution node 504 may replicate at least a portion of the global recorder controlling cabinet 502 to the multiple global recorder control nodes 506, 508, 510, 512.

Figure 6:
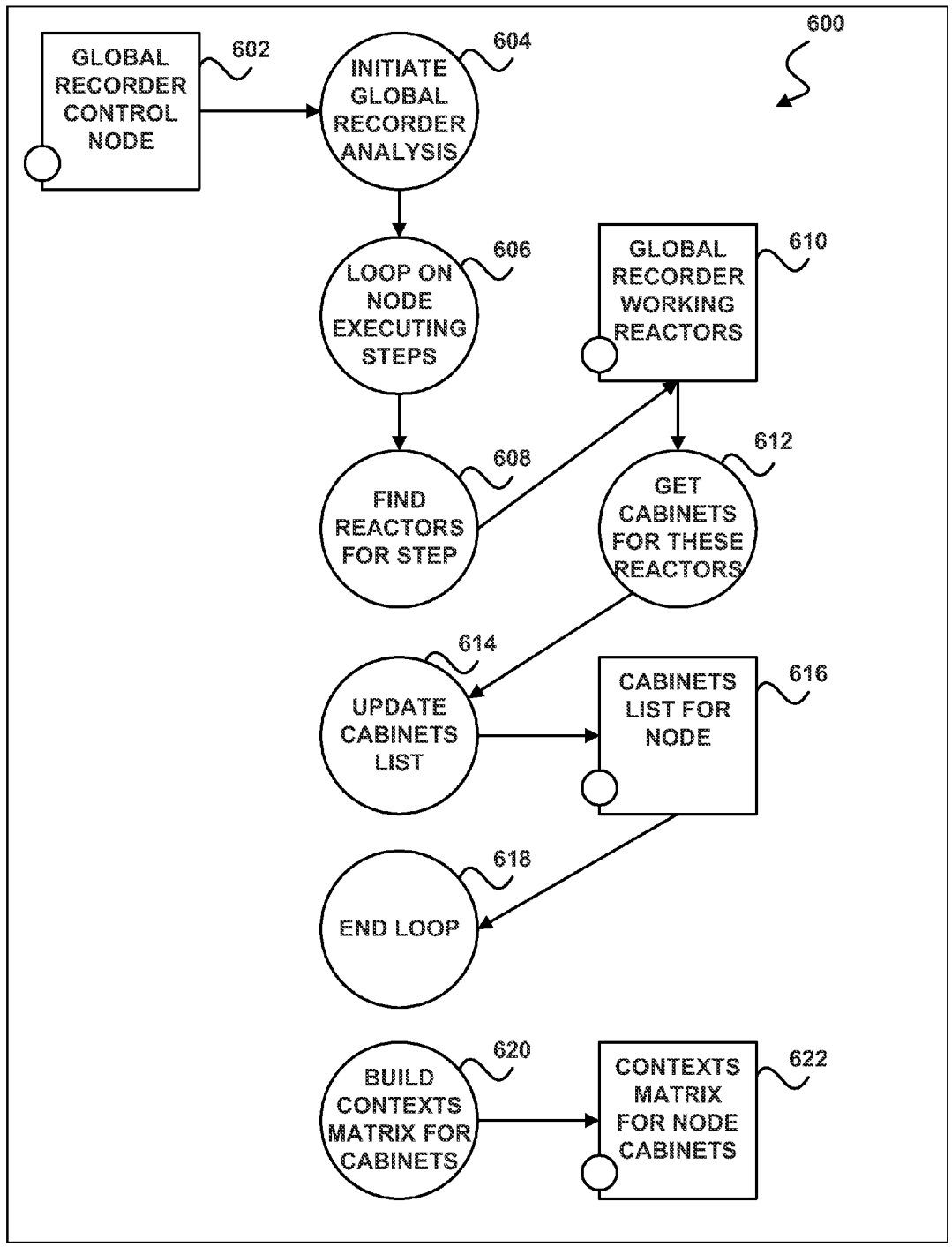
FIG. 6 illustrates a method for a global recorder, in accordance with another embodiment.

FIG. 6 illustrates a method 600 for a global recorder, in accordance with another embodiment. As an option, the method 600 may be implemented in the context of the details of FIGS. 1-5. Of course, however, the method 600 may be carried out in any desired environment. Further, the aforementioned definitions may equally apply to the description below.

As shown in operation 604, the global recorder control node 602 initiates global recorder analysis. As an option, the global recorder analysis may be initiated for each node. Additionally, as yet another option, the global recorder analysis may locate all states that appear for each node. Just by way of example, the nodes may include any of the global recorder control nodes described above with respect to FIG. 5. Furthermore, each node may note the cabinets that appear during processing.

Further, a loop starts for each node executing, steps, as shown in operation 606. Additionally, each reactor associated with the steps is located. See operation 608. Optionally, locating each reactor may include checking every statement for an occurrence where a cabinet field is influenced for a reactor. For example, the statement may include any step utilizing a state operator. Optionally, influencing the cabinet field may include adding new records, and/or modifying an existing cabinet. As an example, the statement may influence multiple reactors. In addition, each reactor associated with the steps is indicated as global recorder working reactors 610. Additionally, the cabinets associated with the global recorder working reactors 610 are retrieved, as shown in operation 612.

Further, as shown in operation 614, a cabinet list for each node 616 may be updated. For example, the cabinet list for each node 616 may be include in a node cabinets cabinet. For example, Table 2 illustrates an exemplary structure of the node cabinets cabinet (e.g. cabinet 2801).

TABLE 2

| SLOT | CONTEXT | DESCRIPTION | REMARKS |
|---|---|---|---|
| LINKTO (GH) | POINTER TO GLOBAL RECORDER CONTROLLING CABINETS CABINET | GLOBAL RECORDER REQUEST ASSOCIATION | |

TABLE 2-continued

| SLOT | CONTEXT | DESCRIPTION | REMARKS |
|---|---|---|---|
| N1 | NODE | | |
| N2 | CABINET | | |
| N3 | BASE CABINET | | |
| N4 | SPECTRUM CABINET | | |
| N5 | | | |
| C1 | CABINET NAME | | |
| D1 | FIRST_APPEARANCE_TIME | | |
| D2 | LAST_APPEARANCE_TIME | | | in another embodiment, updating the cabinet list for each node 616 may include consolidating the global recorder working reactors and reactors associated with the statements. Furthermore, as yet another option, the consolidation may include updating attributes (e.g. FIRST_APPEARANCE_TIME) in the node cabinets cabinet. Optionally, the consolidation may include updating the managing base cabinet and/or spectrum cabinet. Further, as an option, after all statements have executed, the cabinet list for each node 616 may be full. Additionally, as yet another option, some of the cabinets may represent transient states, and therefore may not have a presence in any reactor at the end of the node processing.

As shown in operation 618, the loop on nodes executing steps ends. Further, after node processing has terminated, the contexts matrix for the node cabinets 622 is built. See operation 620. Optionally, a metadata cabinet may be accessible. As an option, after node processing has terminated, all of the contexts for the resulting cabinets may be retrieved. For example, the resulting cabinets ma indicate the recorded cabinets. Optionally, the contexts matrix for the node cabinets may be stored in a node contexts cabinet. For example, Table 3 illustrates an exemplary cabinet structure of the node cabinets applying some context (e.g. cabinet 2803).

TABLE 3

| SLOT | CONTEXT | DESCRIPTION | REMARKS |
|---|---|---|---|
| LINKTO (GH) | POINTER TO GLOBAL RECORDER CONTROLLING CABINETS CABINET | GLOBAL RECORDER REQUEST ASSOCIATION | |
| TRACKER (GH) | POINTER TO FIRST CONTEXT REGID (GH) | ACTIVE WHEN MORE THAN 12 CABINETS SHARE A SAME CONTEXT | |
| N1 | NODE | | |
| C1 | CONTEXT | | |
| C2 | DESCRIPTION | | |
| D1 | FIRST CONTEXT APPEARANCE | | |
| D2 | LAST CONTEXT APPEARANCE | | |
| N2 | CABINET 1 | | |
| N3 | CABINET 2 | | |
| N4 | CABINET 3 | | |
| N5 | CABINET 4 | | |
| N6 | CABINET 5 | | |
| N7 | CABINET 6 | | |
| N8 | CABINET 7 | | |
| N9 | CABINET 8 | | |
| N10 | CABINET 9 | | |
| N11 | CABINET 10 | | |
| N12 | CABINET 11 | | |
| N13 | CABINET 12 | | |
| N14 | | | |
| N15 | | | |

In another embodiment, the node cabinets cabinet may include a list of cabinets for each context. As an option, each record in the node cabinets cabinet may include any number of cabinets. For example, as illustrated in Table 3, each record may include a list of 12 cabinets. Furthermore, as yet another option, if there are more than the number of cabinets, a pointer in the next record may be created to reference the base record with the additional cabinets for the context.

Figure 7:
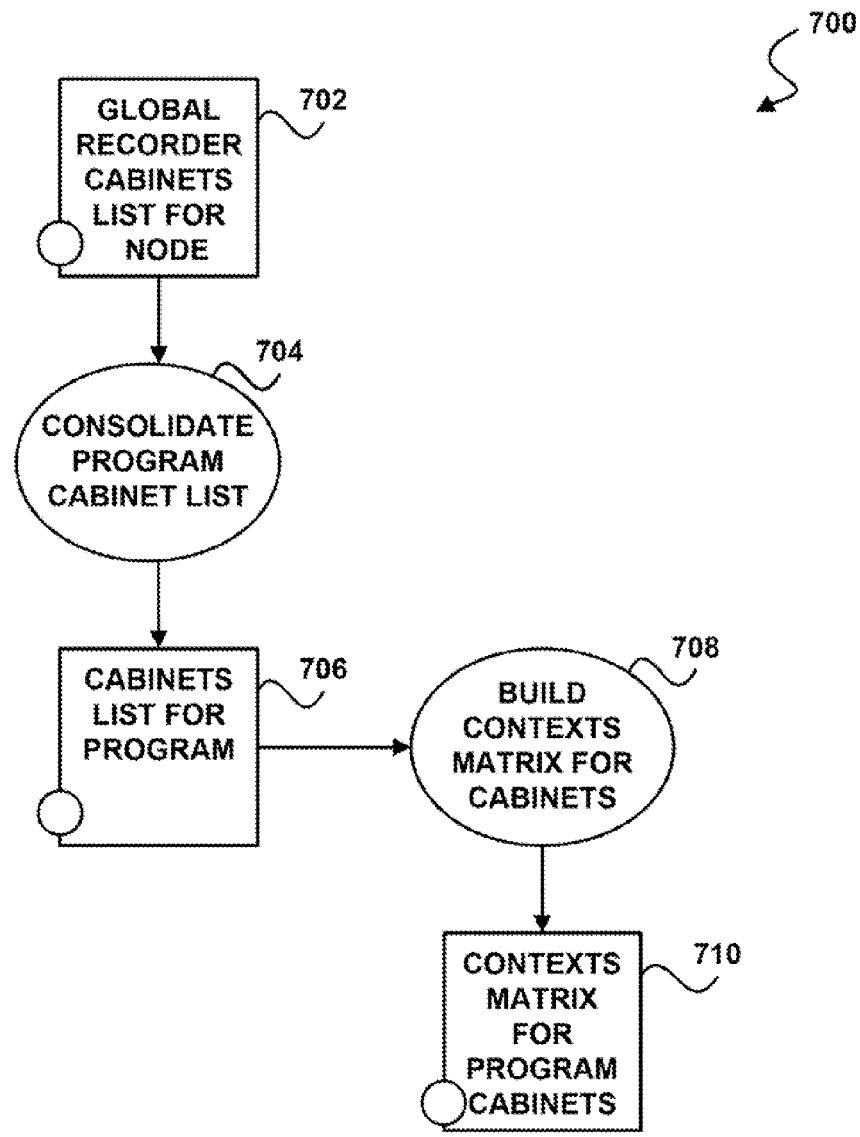
FIG. 7 illustrates method for global recording processing, in accordance with yet another embodiment.

FIG. 7 illustrates a method for global recording processing 700, in accordance with yet another embodiment. As an option, the method 700 may be implemented in the context of the details of FIGS. 1-6. Of course, however, the method 700 may be carried out in any desired environment. Further, the aforementioned definitions may equally apply to the description below.

As shown in operation 704, the program cabinet list 706 is consolidated. Optionally, consolidating, the program cabinet list 706 may occur after processing has terminated for all nodes. Further, as yet another option, consolidating the program cabinet list 706 may include processing the global recorder cabinets list for all nodes 702 to consolidate into the program cabinet list 706. As an option, the program cabinets list 706 may include at least one program cabinets cabinet record. For example. Table 4 illustrates an exemplary structure of the program cabinets cabinet record (e.g. cabinet 2802).

TABLE 4

| SLOT | CONTEXT | DESCRIPTION | REMARKS |
|---|---|---|---|
| LINKTO (GH) | POINTER TO GLOBAL RECORDER CONTROLLING CABINETS CABINET | GLOBAL RECORDER REQUEST ASSOCIATION | |
| N1 | PROGRAM | | |
| N2 | CABINET | | |
| N3 | BASE CABINET | | |
| N4 | SPECTRUM CABINET | | |
| N5 | | | |
| C1 | CABINET NAME | | |
| D1 | FIRST_APPEARANCE_TIME | | |
| D2 | LAST_APPEARANCE_TIME | | |

Furthermore, the context matrix for cabinets is built. Sec operation 708. As an option, building, the context matrix for cabinets may include consolidating the program cabinets list 706 into a context matrix for program cabinets 710. Optionally, the context matrix for program cabinets may include at least one program contexts cabinet record. For example, Table 5 illustrates an exemplary structure of the program contexts cabinet record (e.g. cabinet 2804).

TABLE 5

| SLOT | CONTEXT | DESCRIPTION | REMARKS |
|---|---|---|---|
| LINKTO (GH) | POINTER TO GLOBAL RECORDER CONTROLLING CABINETS CABINET | GLOBAL RECORDER REQUEST ASSOCIATION | |
| TRACKER (GH) | POINTER TO FIRST CONTEXT REGID (GH) | ACTIVE WHEN MORE THAN 12 CABINETS SHARE A SAME CONTEXT | |
| N1 | PROGRAM | | |
| C1 | CONTEXT | | |
| C2 | DESCRIPTION | | |
| D1 | FIRST CONTEXT APPEARANCE | | |
| D2 | LAST CONTEXT APPEARANCE | | |

TABLE 5-continued

| SLOT | CONTEXT | DESCRIPTION | REMARKS |
|---|---|---|---|
| N2 | CABINET 1 | | |
| N3 | CABINET 2 | | |
| N4 | CABINET 3 | | |
| N5 | CABINET 4 | | |
| N6 | CABINET 5 | | |
| N7 | CABINET 6 | | |
| N8 | CABINET 7 | | |
| N9 | CABINET 8 | | |
| N10 | CABINET 9 | | |
| N11 | CABINET 10 | | |
| N12 | CABINET 11 | | |
| N13 | CABINET 12 | | |
| N14 | | | |
| N15 | | | |

In one embodiment, for each node, each nodal cabinets cabinet (e.g. cabinet 2801) may be consolidated into a program reactor with the program cabinets cabinet (e.g. cabinet 2802). Further, in another embodiment, for each node, each nodal contexts cabinet (e.g. cabinet 2803) may be consolidated into a program reactor with the program contexts cabinet (e.g. cabinet 2804). For example, Tables 2-5 as described above may illustrate an exemplary structure of output cabinets for the method for global recording processing 700.

Figure 8:
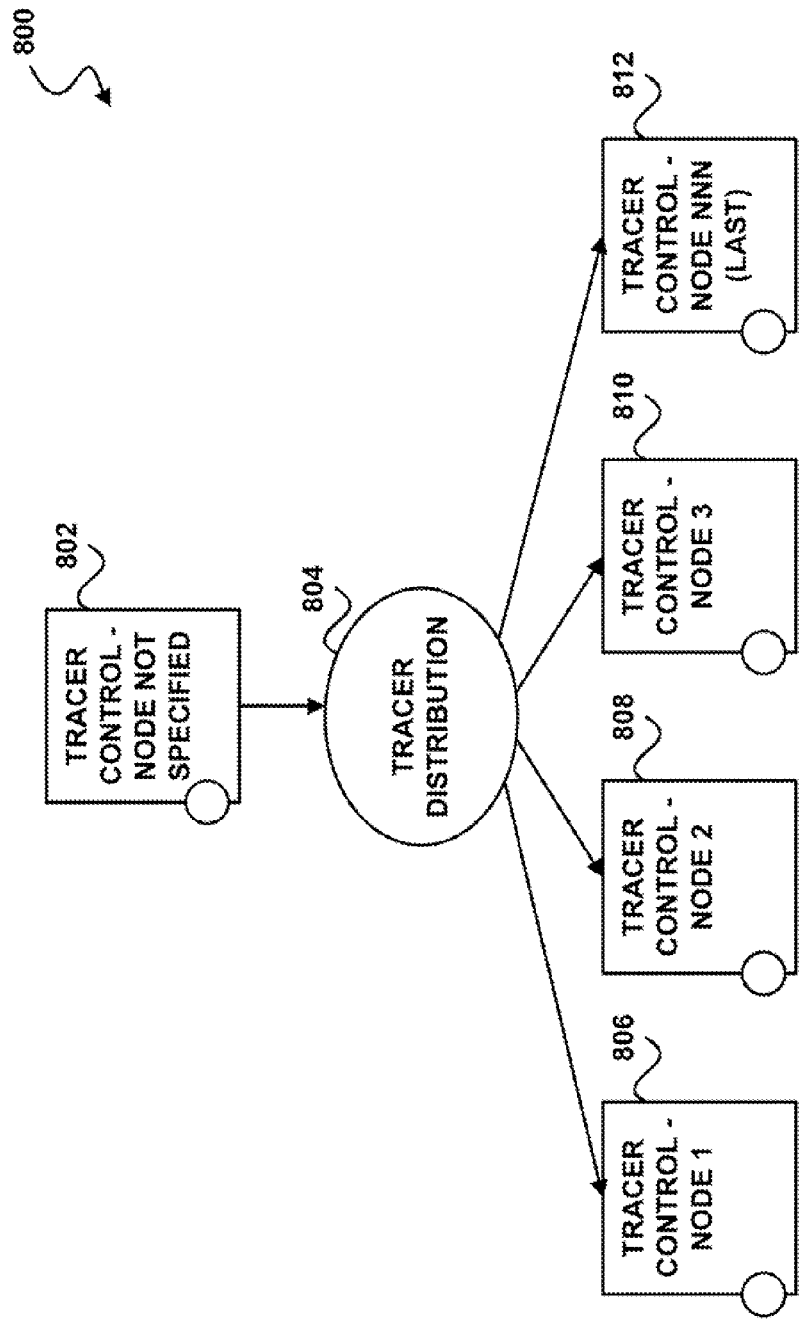
FIG. 8 illustrates a tracer control distribution system, in accordance with still yet another embodiment.

FIG. 8 illustrates a tracer control distribution system 800, in accordance with still yet another embodiment. As an option, the system 800 may be implemented in the context of the details of FIGS. 1-7. Of course, however, the system 800 may be carried out in any desired environment. Further, the aforementioned definitions may equally apply to the description below.

In one embodiment, a tracer controlling cabinet 802 may control a tracer. As an option, the tracer controlling cabinet 802 may utilize two data structures. In another embodiment, one data structure may include a cabinet controlling, cabinet (e.g. cabinet 2702). As an option, metadata may be associated with the cabinet controlling cabinet. Optionally, the metadata may describe settings and data associated with the cabinet controlling cabinet. For example, Table 6 illustrates an exemplary structure of the cabinet controlling cabinet record.

TABLE 6

| SLOT | CONTEXT | DESCRIPTION | REMARKS |
|---|---|---|---|
| N1 | SUPERVISOR | | |
| N2 | PROGRAM_NO | | |
| N3 | OSS_NODE | | NULL = ALL |
| N4 | CABINET | EVENTUALLY SPECTRUM CABINET | |
| N5 | STOP_MODE | 0 - STOP ON EACH STEP<br>1 - STOP ON NEXT OCCURRENCE OF THE CABINET<br>2 - STOP ON FIRST DISAPPEARANCE OF THE CABINET<br>3 - STOP ON CHANGED MASS OF THE CABINET<br>4 - RESUME TRACE<br>5 - HALT PROGRAM | |
| N6 | | | |
| N7 | | | 1 - REFRESH |
| N8 | REQUEST_NO | | |
| D1 | START_TIME | | ACTUAL START TIME |
| D2 | END_TIME | | ACTUAL END TIME |

In another embodiment, another data structure may include a context controlling cabinet (e.g. cabinet 2703). As an option, metadata may be associated with the context controlling, cabinet. Optionally, the metadata may describe settings and data associated with the context controlling cabinet. For example. Table 7 illustrates an exemplary structure of the context controlling cabinet record (e.g. cabinet 2703).

TABLE 7

| SLOT | CONTEXT | DESCRIPTION | REMARKS |
|---|---|---|---|
| N1 | SUPERVISOR | | |
| N2 | PROGRAM_NO | | |
| N3 | OSS_NODE | | NULL = ALL |
| C1 | CONTEXT | | SUPER CONTEXT |
| N5 | STOP_MODE | 0 - STOP ON EACH STEP<br>1 - STOP ON NEXT OCCURRENCE OF THE CONTEXT<br>2 - STOP ON FIRST DISAPPEARANCE OF THE CONTEXT<br>3 - NON-ACTIVE<br>4 - RESUME TRACE<br>5 - HALT PROGRAM | |
| N6 | | | |
| N7 | | | 1 - REFRESH |
| N8 | REQUEST_NO | | |
| D1 | START_TIME | | ACTUAL START TIME |
| D2 | END_TIME | | ACTUAL END TIME |

Furthermore, in yet another embodiment, the tracer may include a tracer control node 802. As an option, tracer application may include multiple tracer control nodes 806, 808, 810, 812. As an option, each tracer control node may include at least one processing node. Further, as yet another option, each tracer node may trace states and/or contexts specific to the processing, node. Optionally, if there are multiple processing nodes, the states and/or contexts may be traced for a specific processing node. In addition, as another option, the states and/or contexts ma be traced for all processing nodes. In one embodiment, if the states and/or contexts are being traced for all processing nodes, then a tracer distribution node 804 may be employed. As an option, the tracer distribution node 804 may replicate at least a portion of the tracer controlling cabinet 802 to the multiple tracer control nodes 806, 808, 810, 812.

Figure 9:
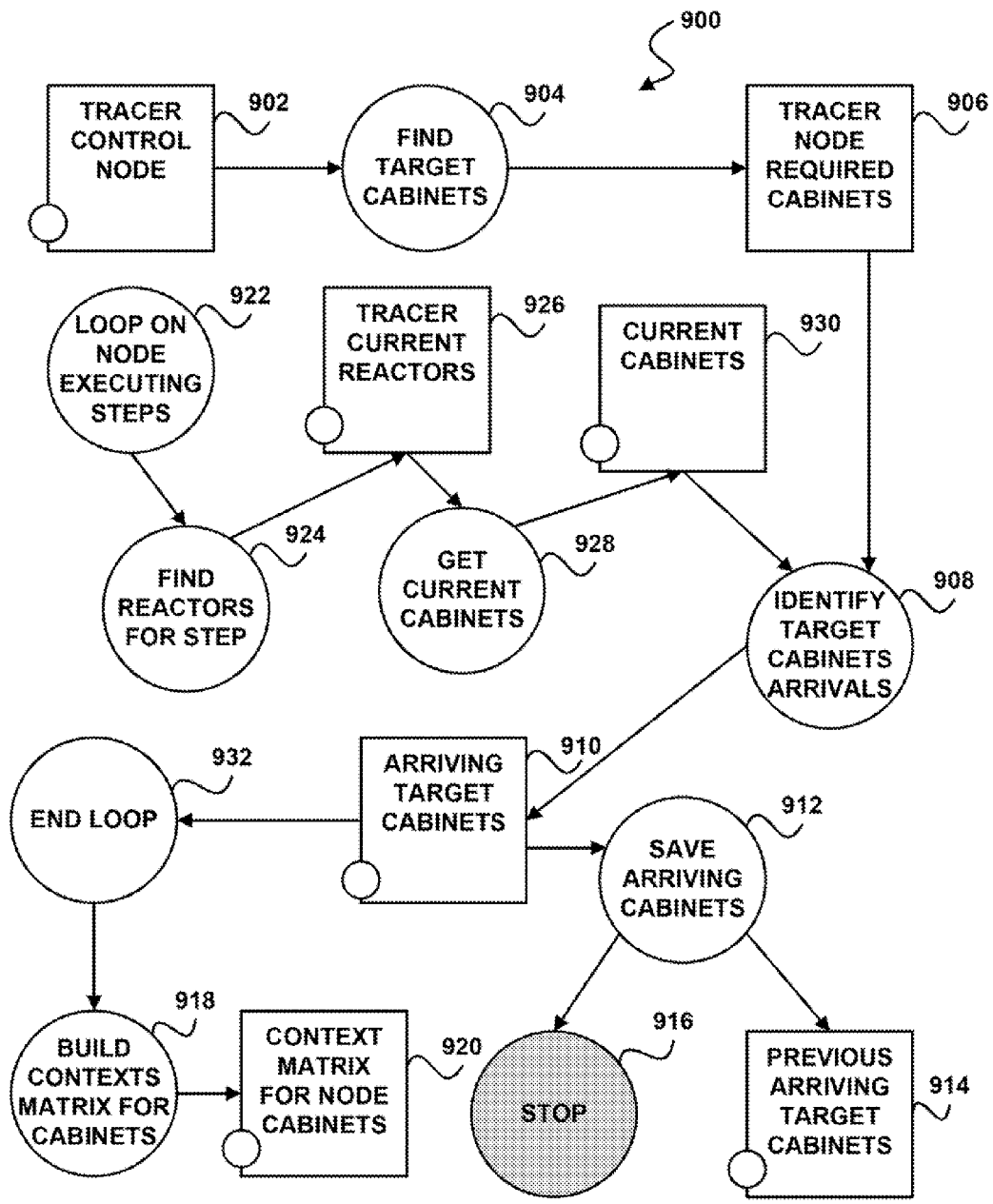
FIG. 9 illustrates a method for a tracer, in accordance with one embodiment.

FIG. 9 illustrates a method for a tracer 900, in accordance with one embodiment. As an option, the method 900 may be implemented in the context of the details of FIGS. 1-8. Of course, however, the method 900 may be carried out in any desired environment. Further, the aforementioned definitions may equally apply to the description below.

As shown in operation 904, the tracer control node 902 finds target cabinets. Further, after the target cabinets are found, the target cabinets may be stored in a tracer node required cabinets 906 data structure. As an option, the tracer node required cabinets 906 data structure may include a reactor. Additionally, as another option, the reactor may include a flip-flop reactor. Optionally, the tracer control node 902 may indicate to indicate to store selected target cabinets. As yet another option, the tracer control node 902 may indicate to store all cabinets. Furthermore, as yet another option, the tracer node required cabinets 906 may indicate each cabinet that may be traced.

Additionally, the tracer 900 loops through each node executing a step, as shown in operation 922. Further, the tracing node finds each reactor where the executed step affects the cabinet field for the reactor. See operation 924.

Still yet, the tracer 900 may store reactors with the affected cabinet field into a tracer current reactors 926 data structure. As an option, the tracer current reactors 926 data structure may include a reactor. As another option, storing the reactors may include storing a cabinet identifier for each of the affected reactors.

In addition, the tracer 900 retrieves current cabinets from the tracer current reactors 926, as shown in operation 928. As another option, the current cabinets retrieved may be stored in the current cabinets 930 data structure. As an option, the current cabinets 930 data structure may include a reactor. Additionally, the tracer 900 identifies target cabinet arrivals, as shown in operation 908. As an option, identifying new target cabinet arrivals may include comparing the tracer node required cabinets 906 against the current cabinets 930. Furthermore, as yet another option, if the new target cabinet arrivals are found, then contexts for the new target cabinet arrivals may be stored in an arriving target cabinets 910 data structure. As an option, a metadata cabinet may be accessible. Optionally, the arriving target cabinets 910 data structure may include a reactor. As shown in operation 932, the loop on each node executing a step 922 ends.

As shown in operation 912, the new target cabinet arrivals are saved. As an option, the saved new target cabinet arrivals may be checked against previous target cabinet arrivals stored in the previous arriving target cabinets 914 data structure. Optionally, the previous arriving target cabinets 914 data structure ma include a reactor. Further, if the new target cabinet arrivals match a cabinet in the previous arriving target cabinets 914, then the stop policy is executed. See operation 916. As yet another option, after the match check, the new target cabinet arrivals may be stored in the previous arriving target cabinets 914. Additionally, as an option, if a cabinet in the previous arriving target cabinets 914 does not match a cabinet of the new target cabinet arrivals, then it may be removed from the previous arriving target cabinets 914.

In one embodiment, the aforementioned cabinets and/or contexts may be stared in exemplary data structures as illustrated in Tables 8-11. For example, Table 8 illustrates an exemplary structure of the node cabinets cabinet record (e.g. cabinet 2811).

TABLE 8

| SLOT | CONTEXT | DESCRIPTION | REMARKS |
|---|---|---|---|
| LINKTO (GH) | POINTER TO CABINET CONTROLLING CABINET | TRACER REQUEST ASSOCIATION | |
| N1 | NODE | | |
| N2 | CABINET | | |
| N3 | BASE CABINET | | |
| N4 | SPECTRUM CABINET | | |
| N5 | | | |
| C1 | CABINET NAME | | |
| D1 | FIRST_APPEARANCE_TIME | | |
| D2 | LAST_APPEARANCE_TIME | | |

As another example, Table 9 illustrates an exemplary structure of the program cabinets cabinet record (e.g. cabinet 2812).

TABLE 9

| SLOT | CONTEXT | DESCRIPTION | REMARKS |
|---|---|---|---|
| LINKTO (GH) | POINTER TO CABINET CONTROLLING CABINET | GLOBAL RECORDER REQUEST ASSOCIATION | |
| N1 | PROGRAM | | |
| N2 | CABINET | | |
| N3 | BASE CABINET | | |
| N4 | SPECTRUM CABINET | | |
| N5 | | | |
| C1 | CABINET NAME | | |
| D1 | FIRST_APPEARANCE_TIME | | |
| D2 | LAST_APPEARANCE_TIME | | |

As yet another example, Table 10 illustrates an exemplary structure of the node contexts cabinet record (e.g. cabinet 2813).

TABLE 10

| SLOT | CONTEXT | DESCRIPTION | REMARKS |
|---|---|---|---|
| LINKTO (GH) | POINTER TO CONTEXT CONTROLLING CABINET | TRACER REQUEST ASSOCIATION | |
| TRACKER (GH) | POINTER TO FIRST CONTEXT REGID (GH) | ACTIVE WHEN MORE THAN 12 CABINETS SHARE A SAME CONTEXT | |
| N1 | NODE | | |
| C1 | CONTEXT | | |
| C2 | DESCRIPTION | | |
| D1 | FIRST CONTEXT APPEARANCE | | |
| D2 | LAST CONTEXT APPEARANCE | | |
| N2 | CABINET 1 | | |
| N3 | CABINET 2 | | |
| N4 | CABINET 3 | | |
| N5 | CABINET 4 | | |
| N6 | CABINET 5 | | |
| N7 | CABINET 6 | | |
| N8 | CABINET 7 | | |
| N9 | CABINET 8 | | |
| N10 | CABINET 9 | | |
| N11 | CABINET 10 | | |
| N12 | CABINET 11 | | |
| N13 | CABINET 12 | | |
| N14 | | | |
| N15 | | | |

As still yet another example. Table 11 illustrates an exemplary structure of the program contexts cabinet record (e.g. cabinet 2814).

TABLE 11

| SLOT | CONTEXT | DESCRIPTION | REMARKS |
|---|---|---|---|
| LINKTO (GH) | POINTER TO CONTEXT CONTROLLING CABINET | TRACER REQUEST ASSOCIATION | |
| TRACKER (GH) | POINTER TO FIRST CONTEXT REGID (GH) | ACTIVE WHEN MORE THAN 12 CABINETS SHARE A SAME CONTEXT | |
| N1 | PROGRAM | | |
| C1 | CONTEXT | | |
| C2 | DESCRIPTION | | |
| D1 | FIRST CONTEXT APPEARANCE | | |
| D2 | LAST CONTEXT APPEARANCE | | |
| N2 | CABINET 1 | | |
| N3 | CABINET 2 | | |
| N4 | CABINET 3 | | |
| N5 | CABINET 4 | | |

TABLE 11-continued

| SLOT | CONTEXT | DESCRIPTION | REMARKS |
|---|---|---|---|
| N6 | CABINET 5 | | |
| N7 | CABINET 6 | | |
| N8 | CABINET 7 | | |
| N9 | CABINET 8 | | |
| N10 | CABINET 9 | | |
| N11 | CABINET 10 | | |
| N12 | CABINET 11 | | |
| N13 | CABINET 12 | | |
| N14 | | | |
| N15 | | | | in one embodiment, after the loop on node executing steps has terminated, as shown in operation 932, all of the contexts for the resulting cabinets may be activated. Optionally, the resulting cabinets may include the traced cabinets. As shown in operation 918, the context matrix is built for each cabinet. Further, each context matrix may be stored in a context matrix for node cabinets 920 data structure. Optionally, the context matrix for node cabinets 920 data structure may include a reactor. For example, the context matrix for node cabinets 920 data structure may include a data structure as illustrated in Table 10 (e.g. cabinet 2813). In addition, for each context, a list of cabinets may be included. As an option, the list of cabinets may include any number of cabinets. For example, as illustrated in Table 10, each record may include a list of 12 cabinets. Furthermore, as yet another option, if there are more than the number of cabinets in a base record, a pointer in the next record may be created to reference the base record with the additional cabinets for the context.

Figure 10:
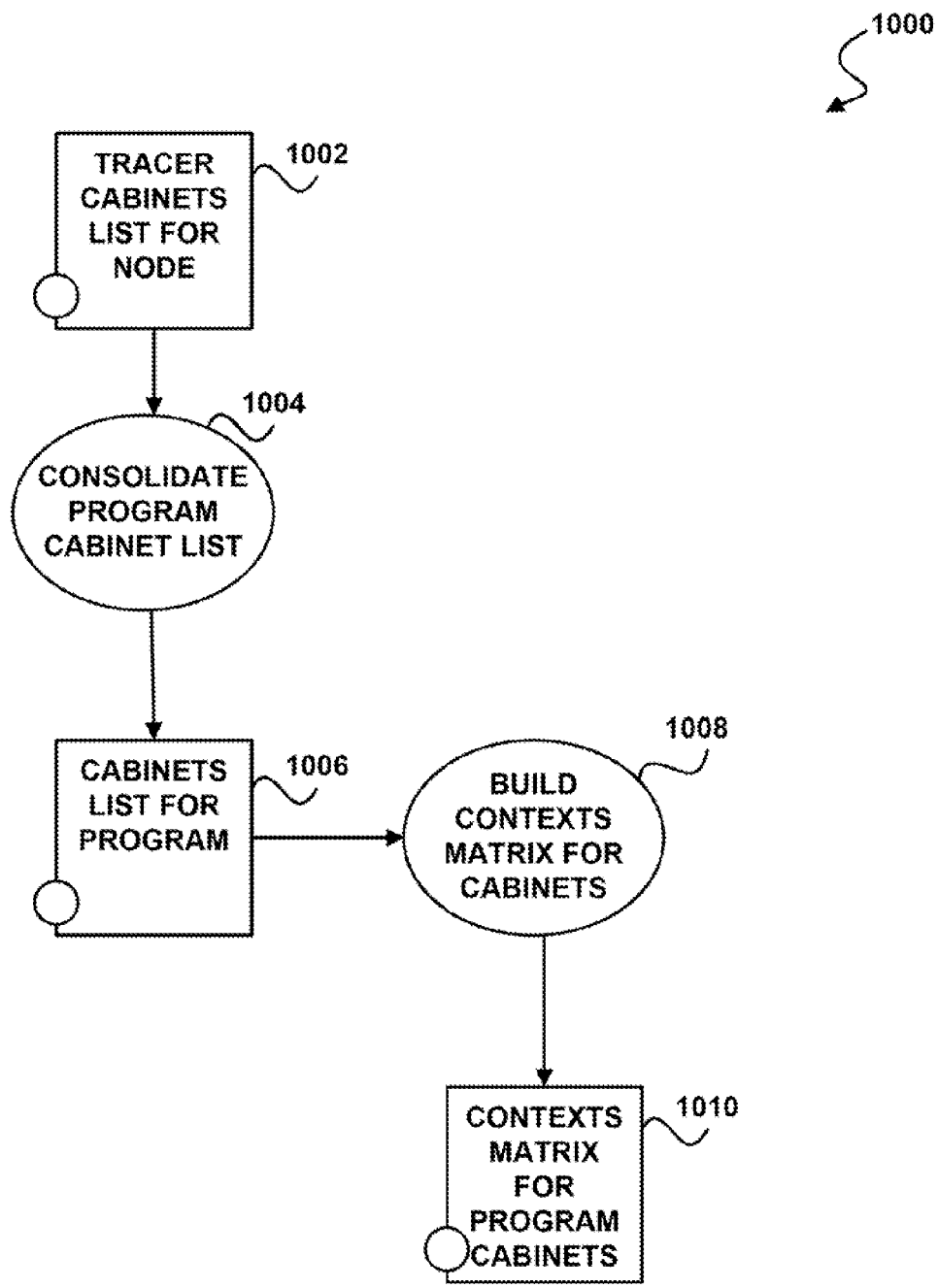
FIG. 10 illustrates a method for a tracer processing system, in accordance with another embodiment.

FIG. 10 illustrates a method for a tracer processing, system 1000, in accordance with another embodiment. As an option, the method 1000 may be implemented in the context of the details of FIGS. 1-9. Of course, however, the method 1000 may be carried out in any desired environment. Further, the aforementioned definitions may equally apply to the description below.

As shown in operation 1004, a tracer cabinets list for node 1002 is consolidated into a cabinet list for program 1006. Optionally, consolidating the program cabinet list may occur after processing has terminated for all nodes. Further, as yet another option, consolidating the program cabinet list may include processing the tracer cabinets list for all nodes 1002 to consolidate into the cabinets list for program 1006. As an option, the cabinets list for program 1006 may include at least one program cabinets cabinet traced. For example, Table 9 illustrates an exemplary structure of a cabinets list for program record (e.g. cabinet 2812).

Furthermore, the context matrix for cabinets is built. See operation 1008. As an option, building, the context matrix for cabinets may include consolidating the cabinets list for program 1006 into a contexts matrix for program cabinets 1010. Optionally, the contexts matrix for program cabinets may include at least one program contexts cabinet record. For example, Table 11 illustrates an exemplary structure of the program contexts cabinet record (e.g. cabinet 2814).

In one embodiment, for each node, each nodal cabinets cabinet (e.g. cabinet 2811) may be consolidated into a program reactor with the program cabinets cabinet (e.g. cabinet 2812). Further, in another embodiment, for each node, each nodal contexts cabinet (e.g. cabinet 2813) may be consolidated into a program reactor with the program contexts cabinet (e.g. cabinet 2814). For example, Tables 8-11, as described above, may illustrate an exemplary structure of output cabinets for the tracer processing system 1000.

In one exemplary embodiment, a raw data stream may include a plurality of contexts. As an option, the raw data stream may be initially processed into a root cabinet (e.g. raw cabinet 1000). Optionally, additional contexts may be identified during the processing. Further, as yet another option, the plurality of contexts and/or the additional contexts may be associated with a plurality of cabinets. For example, Table 12 illustrates an exemplary list of contexts and associated cabinets.

TABLE 12

| CONTEXT | RAW CABINET 1000* | FLAT CABINET 1201 | FAMILY CABINET 1202 (RELATIVE = WIFE CABINET 1203) | VPN CABINET 1204 | RANGED CABINET 1205 | TIERS CABINET 1601 | PERSISTENT DATA CABINET 2301 |
|---|---|---|---|---|---|---|---|
| EVENT_ID | + | | | | | | + |
| SESSION_ID | + | | | | | | |
| DEVICE_ID | + | | | | | | + |
| IMSI | + | | | | | | |
| SERVICE | + | | | | | | + |
| ACTION | + | | | | | | + |
| SUBSCRIBER | + | | | | | | + |
| START_TIME | + | | | | | | + |
| END_TIME | + | | | | | | + |
| PARTY | + | | | | | | + |
| DURATION | + | | | | | | |
| OFFER_TYPE | + | | | | | | + |
| DURATION_TO_CHARGE | | + | + | + | + | | + |
| UNIT_RATE | | + | + | + | | | |
| AMOUNT | | + | + | + | + | | + |
| FAMILY_BALANCE | | | + | | | | |
| WIFE_NAME | | | + (1203) | | | | |
| VPN_NAME | | | | + | | | |
| PARTY_POSITION | | | | + | | | |
| TIERS | | | | | + | | |
| TIER_LEVEL | | | | | | + | |
| TIER_RATE | | | | | | + | |
| TIER_LOW | | | | | | + | |
| TIER_HIGH | | | | | | + | |

In another embodiment, the plurality of contexts may initially include contexts associated with the root cabinet. For example, the plurality of contexts may include EVENT_ID, SESSION_ID, DEVICE_ID, IMSI, SERVICE, ACTION, SUBSCRIBER, START_TIME, END_TIME, PARTY, DURATION, and/or OFFER_TYPE. As yet another example, the additional contexts may include DURATION_TO_CHARGE, UNIT_RATE, AMOUNT, FAMILY_BALANCE, WIFE_NAME, VPN_NAME. PARTY_POSITION, TIERS, TIER_LEVEL, TIER_RATE, TIER_LOW, and/or TIER_HIGH.

In still yet another embodiment, not all possible contexts may exist simultaneously. As an option, only a subset of valid contexts may exist for some point in time. Furthermore, as another option, the additional contexts may appear and/or disappear as a result state development.

Additionally, as yet another option, additional contexts may be acquired based on time. As an example, for the records associated with the raw cabinet 1000, the context named SUBSCRIBER may appear after a collision with a reference cabinet that changes the cabinet to a confirmed cabinet (e.g. cabinet 1002). Further, in the context of the current example, the records may be associated with the rejected cabinet (e.g. cabinet 1101) for those records where the cabinet is not changed to the confirmed cabinet.

In yet another embodiment, the contexts may be shared with cabinets associated with a common root cabinet (e.g. cabinet 1000). Additionally, in another embodiment, the contexts may be shared with cabinets associated with a distinct cabinet. As an option, the context OFFER_TYPE may be associated with values such as FLAT, FAMILY, VPN, and/or RANGED. For example, the context OFFER_TYPE may be shared with any cabinet associated with the common root cabinet (e.g. cabinet 1000). In the context of the current example, the context OFFER_TYPE may not be shared with the rejected cabinet (e.g. cabinet 1101) and/or a persistent data cabinet (e.g. cabinet 2301) if the cabinet is not associated with the common root cabinet.

In still yet another embodiment, the processing may cause contexts to appear and/or disappear. As an option, the contexts may appear and/or disappear according to an order of steps associated with the processing and/or synchronization between operating nodes. For example, as illustrated in Table 12 above, the context WIFE_NAME may be represented as an intermediate context. Optionally, the intermediate context may not exist in a final state (e.g. persistent data cabinet 2301). For example, a wife cabinet (e.g. cabinet 1203) may be derived from a family cabinet (e.g. cabinet 1202) if the family cabinet includes a record with an active WIFE_NAME context. Further, in the context of the current example, the wife cabinet may only exist for a period of time while the WIFE_NAME context is active, and may only be traceable during that period of time.

In another embodiment, a node may include a Registrator node (REG), a Rater node (RATE), and/or as Discharger node DIS). For example, Table 13 illustrates an exemplary listing of a chronological state development for a particular time tick or step.

TABLE 13

| TICK | NODE | REACTOR | AFFECTED CABINET | NAME | LOOP | OUTSTANDING RAW RECORDS | STATE DISAPPEAR AFTER |
|---|---|---|---|---|---|---|---|
| 1 | REG | R_1 | 1001 | RAW | | 10000 | |
| 2 | REG | R_1 | 1002 | CONFIRMED | | 10000 | |
| 3 | REG | R_1 | 1101 | FINAL-REJECTED | | 9996 | |
| 4 | REG | R_2 | 1003 | PENDING | | 26 | |
| 5 | RATE | P_1 | 1005 | RAW-FLAT | | | 7 |
| 6 | RATE | P_2 | 1201 | FLAT | | | 7 |
| 7 | DIS | O_1 | 1102 | RAW FINAL | | | |
| 8 | DIS | O_2 | 1301 | RATED | | | |
| 9 | DIS | Q_3 | 1401 | AGGREGATE | | | |
| 10 | RATE | P_1 | 1006 | RAW-FLAT | | | 13 |
| 11 | RATE | P_2 | 1202 | FAMILY | | | 13 |
| 12 | RATE | P_2 | 1203 | FAMILY + WIFE | | | 13 |
| 13 | DIS | O_1 | 1102 | RAW FINAL | | | |
| 14 | DIS | O_2 | 1301 | RATED | | | |
| 15 | DIS | Q_3 | 1401 | AGGREGATE | | | |
| 16 | RATE | P_1 | 1007 | RAW-VPN | | | 18 |
| 17 | RATE | P_2 | 1204 | VPN | | | 18 |
| 18 | DIS | O_1 | 1102 | RAW FINAL | | | |
| 19 | DIS | O_2 | 1301 | RATED | | | |
| 20 | DIS | Q_3 | 1401 | AGGREGATE | | | |
| 21 | RATE | P_1 | 1008 | RAW-RANGED | | | 25 |
| 22 | RATE | P_2 | 1205 | RANGED | | | 25 |
| 23 | RATE | P_3 | 1601 | TIERS | Y | | 25 |
| 24 | RATE | P_2 | 1205 | RANGED | Y | | 25 |
| 25 | DIS | O_1 | 1102 | RAW FINAL | | | |
| 26 | DIS | O_2 | 1301 | RATED | | | |
| 27 | DIS | Q_3 | 1401 | AGGREGATE | | | |

In one embodiment, a state may appear when a new record arrives. As an option, the new state may appear when other states are transitioned to the state. In another embodiment, a state may disappear when all records are moved to other states. Optionally, the state may disappear when the cabinet mass reaches zero. Furthermore, as illustrated above in Table 13, states may disappear at each time tick or step. As an option, the disappearance of a state may occur based on the elapsed time. Optionally, the disappearance of the state may occur based on an event.

While various embodiments have been described, above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

The invention claimed is:

1. A computer program product embodied on a non-transitory computer storage medium, comprising:
   computer code for receiving data from an entity;
   computer code for recording type information associated with the entity; and
   computer code for recording state information associated with the entity;
   wherein the type information and the state information are used to process the data, the processing including data stream filtering and data stream regrouping;
   wherein the data includes a data stream;
   wherein the computer program product operates such that the data stream filtering includes filtering the data stream in order to match at least one of a plurality of rules stored in a rules table, each of the plurality of rules having an associated linker field that holds a permutation of contexts identified by a unique cabinet identifier of a cabinet of a database table that stores data from the data stream associated with the permutation of contexts, where the rules table further includes an additional field for identifying a particular rule that is to be fired when a particular context is met for the data from the data stream;
   wherein each context in the permutation of contexts includes a number of distinct appearances of a type of data in the data stream;
   wherein a linker field for each of a plurality of cabinets of the database table sets a context of reactor fields associated with the data stream;
   wherein the computer program product operates such that the data stream regrouping includes regrouping the data from the data stream matching at least one of the rules into one of the contexts;
   wherein the computer program product operates such that the type information and the state information are used to pause an application of a first process being applied to the data and applying a second process to the data;
   wherein the computer program product operates such that the type information and the state information are used to resume the application of the first process.

2. The computer program product of claim 1, wherein the type information and the state information are encoded in a data structure.

3. The computer program product of claim 2, wherein the data structure is used to process the data.

4. The computer program product of claim 2, wherein the data structure is a component of the data.

5. The computer program product of claim 1, wherein the data structure is an attribute of the data.

6. The computer program product of claim 1, wherein the entity includes a plurality of nodes.

7. The computer program product of claim 6, wherein the state information reflects a state of each of the plurality of nodes.

8. The computer program product of claim 1, wherein the state information includes first state information associated with the entity at a first time and second state information associated with the entity at a second time.

9. The computer program product of claim 8, wherein the first state information and the second state information are associated with the entity at the second time.

10. The computer program product of claim 1, wherein at least one of the state information and the type information are conditionally recoded based on at least one aspect of time.

11. The computer program product of claim 1, wherein the entity includes an application program processing the data.

12. The computer program product of claim 1, wherein the processing of the data stream includes filtering the data stream based on a plurality of contexts within the data stream, and the contexts within the data stream include a number of distinct appearances of a type of data in the data stream, a flag, and an attribute.

13. The computer program product of claim 12, wherein the contexts are divided into heavy contexts and light contexts, where the light contexts are conditions and attributes that have a few distinct appearances in the data stream and the heavy contexts are those conditions and attributes that have numerous distinct appearances in the data stream.

14. The computer program product of claim 13, wherein the data stream filtering further includes filtering the data stream utilizing a reduction of context filter which reduces a context of the data stream to a broader context, such that at least one of the heavy contexts is reduced to at least one light context.

15. The computer program product of claim 1, wherein each of the plurality of cabinets contains a plurality of records, and each of the plurality of records includes a header field and a body field, each body field including a plurality of data fields, where a metadata definition is utilized for mapping each of the plurality of data fields to an attribute utilized by at least one other of the plurality of cabinets, and the header field is utilized to control and operate upon the plurality of records in the cabinet.

16. A method, comprising:
   receiving data from an entity;
   recording type information associated with the entity; and
   recording state information associated with the entity;
   consolidating, utilizing a processor, the state information associated with a plurality of processing nodes;
   wherein the type information and the state information are used to process the data, the processing including data stream filtering and data stream regrouping;
   wherein the data includes a data stream;
   wherein the data stream filtering includes filtering the data stream in order to match at least one of a plurality of rules stored in a rules table, each of the plurality of rules having an associated linker field that holds a permutation of contexts identified by a unique cabinet identifier of a cabinet of a database table that stores data from the data stream associated with the permutation of contexts, where the rules table further includes an additional field for identifying a particular rule that is to be fired when a particular context is met for the data from the data stream;
   wherein each context in the permutation of contexts includes a number of distinct appearances of a type of data in the data stream;
   wherein a linker field for each of a plurality of cabinets of the database table sets a context of reactor fields associated with the data stream;
   wherein the data stream regrouping includes regrouping the data from the data stream matching at least one of the rules into one of the contexts;
   wherein the type information and the state information are used to pause an application of a first process being applied to the data and applying a second process to the data;

wherein the type information and the state information are used to resume the application of the first process.

17. The method of claim 16, wherein the entity includes a plurality of nodes.

18. The method of claim 16, wherein the type information and the state information are encoded in a data structure.

19. A system, comprising:
a processor for receiving data from an entity, recording type information associated with the entity, and recording state information associated with the entity;
wherein the type information and the state information are used to process the data, the processing including data stream filtering and data stream regrouping;
wherein the data includes a data stream;
wherein the system operates such that the data stream filtering includes filtering the data stream in order to match at least one of a plurality of rules stored in a rules table, each of the plurality of rules having an associated linker field that holds a permutation of contexts identified by a unique cabinet identifier of a cabinet of a database table that stores data from the data stream associated with the permutation of contexts, where the rules table further includes an additional field for identifying a particular rule that is to be fired when a particular context is met for the data from the data stream;
wherein each context in the permutation of contexts includes a number of distinct appearances of a type of data in the data stream;
wherein a linker field for each of a plurality of cabinets of the database table sets a context of reactor fields associated with the data stream;
wherein the system operates such that the data stream regrouping includes regrouping the data from the data stream matching at least one of the rules into one of the contexts;
wherein the system operates such that the type information and the state information are used to pause an application of a first process being applied to the data and applying a second process to the data;
wherein the system operates such that the type information and the state information are used to resume the application of the first process.

20. The system of claim 19, wherein the processor is coupled to memory via a bus.

* * * * *

UNITED STATES PATENT AND TRADEMARK OFFICE
CERTIFICATE OF CORRECTION

PATENT NO.        : 8,041,740 B1
APPLICATION NO.   : 12/042109
DATED             : October 18, 2011
INVENTOR(S)       : Adi Kariv Page 1 of 1

It is certified that error appears in the above-identified patent and that said Letters Patent is hereby corrected as shown below:

In the claims:
Claim 5, col. 21, line 54; please replace "claim 1" with --claim 2--.

Signed and Sealed this
Thirty-first Day of January, 2012

David J. Kappos
*Director of the United States Patent and Trademark Office*